United States Patent
Heller et al.

(10) Patent No.: US 12,270,938 B2
(45) Date of Patent: Apr. 8, 2025

(54) ACTIVE REFLECTOR WITH OSCILLATION INHIBITION

(71) Applicant: AyDeeKay LLC, Aliso Viejo, CA (US)

(72) Inventors: Tom Heller, Karmiel (IL); Danny Elad, Kibutz Matzuva (IL)

(73) Assignee: AyDeeKay LLC, Aliso Viejo, CA (US)

( * ) Notice: Subject to any disclaimer, the term of this patent is extended or adjusted under 35 U.S.C. 154(b) by 33 days.

(21) Appl. No.: 18/244,190

(22) Filed: Sep. 8, 2023

(65) Prior Publication Data

US 2023/0417871 A1 Dec. 28, 2023

Related U.S. Application Data

(63) Continuation of application No. 16/144,115, filed on Sep. 27, 2018, now Pat. No. 11,789,117.

(51) Int. Cl.
| | | |
|---|---|---|
| *G01S 7/40* | (2006.01) | |
| *G01S 13/82* | (2006.01) | |
| *G01S 13/93* | (2020.01) | |

(52) U.S. Cl.
CPC .......... *G01S 7/4021* (2013.01); *G01S 7/4008* (2013.01); *G01S 13/82* (2013.01); *G01S 13/93* (2013.01)

(58) Field of Classification Search
CPC ...... G01S 7/4021; G01S 7/4008; G01S 13/82; G01S 13/93

USPC ................. 342/165, 137, 128, 149
See application file for complete search history.

(56) References Cited

U.S. PATENT DOCUMENTS

| | | | |
|---|---|---|---|
| 10,917,178 B2* | 2/2021 | Dillon | H04B 10/5165 |
| 2003/0193430 A1 | 10/2003 | Gresham | |
| 2011/0234445 A1 | 9/2011 | Patrick | |
| 2012/0162010 A1 | 6/2012 | Georgiadis | |
| 2015/0219751 A1 | 8/2015 | Ebling | |
| 2016/0109559 A1 | 4/2016 | Delbecq | |
| 2021/0257729 A1* | 8/2021 | Murakowski | H04R 9/08 |
| 2022/0030525 A1* | 1/2022 | Chincholi | H04B 17/14 |

* cited by examiner

*Primary Examiner* — Bo Fan
(74) *Attorney, Agent, or Firm* — Steven Stupp

(57) ABSTRACT

Disclosed active reflector apparatus and methods that inhibit self-induced oscillation. One illustrative apparatus embodiment includes an amplifier and an adjustable phase shifter. The amplifier amplifies a receive signal to generate a transmit signal, the transmit signal causing interference with the receive signal. The adjustable phase shifter modifies the phase of the transmit signal relative to that of the receive signal to inhibit oscillation. A controller may periodically test a range of settings for the adjustable phase shifter to identify undesirable phase shifts prone to self-induced oscillation, and may maintain the phase shift setting at a value that inhibits oscillation.

20 Claims, 3 Drawing Sheets

ACTIVE REFLECTOR WITH OSCILLATION INHIBITION

TECHNICAL FIELD

This disclosure relates generally to active reflecting devices, and more specifically to self-calibrating active reflectors which can prevent oscillation.

BACKGROUND

Current and future vehicles are increasingly incorporating on-board radar systems to enable or aid critical vehicle functions including Adaptive Cruise Control (ACC), Parking Assistance, Forward Collision Warning (FCW), Forward Collision with Active Braking, Blind Spot Warning (BSW), Lane Keeping Systems (LKS), and others. These technologies provide direct driver assistance in normal driving and critical scenarios, and some are even capable of enhancing driver control or providing autonomous control to prevent or mitigate a crash or negative outcome.

Radar is an object-detection system that uses radio waves to determine the range, angle, or velocity of objects. A radar system consists of a transmitter producing electromagnetic waves, a transmitting antenna, a receiving antenna and a receiver. Radio waves from the transmitter reflect off an object and return to the receiver, giving information about the target's location and speed. All naturally-occurring reflections are passive in the sense that no energy is added to the reflected wave during the reflection process. With most reflections, the energy of the passively reflected wave is less than that of the incident wave. Weak reflections will limit detection range of the radar. Another problem to detect the target is the clutter contamination derived from multipath reflections. This is of major concern when the target radar cross section (RCS) is smaller than that of other surrounding objects. In order to mitigate above mentioned problems, an active reflector has been proposed to enhance reflected wave energy. The active reflector is an apparatus that senses a radar signal, amplifies (and sometimes modulates) it, and re-transmits it back to the radar. Active reflectors have several applications in the field of automotive vehicles such as improving maximum radar detection range and visibility of small vehicles (e.g. motorcycles, bicycles), operating as active tags to modulate data on the reflected radar waveform, and serving as portable, configurable dummy targets for testing.

The literature on active reflectors tends to focus on techniques for modulating and re-transmitting radar signals to convey information, and appears to be mostly theoretical. There exist various practical implementation issues that do not appear to be recognized or addressed anywhere in the prior art. In particular, the present inventors have discovered that when active reflectors are implemented with adequate gain factors, they often exhibit a level of self-interference that, through feedback, can cause self-induced oscillation. At a minimum such oscillation may make the active reflector unresponsive to receive signals, but may also present significant interference to surrounding radar sensors.

SUMMARY

Accordingly, there is disclosed herein active reflector apparatus and methods that inhibit self-induced oscillation. One illustrative apparatus embodiment includes an amplifier and an adjustable phase shifter. The amplifier amplifies a receive signal to generate a transmit signal, the transmit signal causing interference with the receive signal. The adjustable phase shifter modifies the phase of the transmit signal relative to that of the receive signal to inhibit oscillation.

One illustrative method embodiment includes: amplifying a receive signal to produce a transmit signal, the transmit signal causing interference with the receive signal; and inhibiting oscillation by modifying a transmit signal phase relative to the receive signal phase.

An illustrative active reflector embodiment includes: means for generating a transmit signal from a receive signal, the transmit signal interfering with the receive signal; and means for shifting a transmit signal phase relative to the receive signal phase to inhibit oscillation.

Each of the foregoing embodiments may be employed separately or conjointly, and may optionally include one or more of the following features in any combination: 1. a controller that tests a range of phase settings of the adjustable phase shifter. 2. for each of the settings tested, the controller determines whether an oscillation indicator exceeds a threshold. 3. the controller selects a central setting in the range if the oscillation indicator remains below the threshold during the test. 4. if the oscillation indicator exceeds the threshold, the controller selects a setting that provides phase margin above a specified minimum value. 5. the range is greater than 180°. 6. if the oscillation indicator exceeds the threshold, the controller selects a setting that maximizes the phase margin. 7. the oscillation indicator is a power level of the receive signal. 8. a modulator that modifies the receive signal before or after amplification by the amplifier. 9. said inhibition of oscillation includes testing a range of settings for an adjustable phase shifter that performs said modifying. 10. said inhibiting further includes determining, for each of the settings tested, whether an oscillation indicator exceeds a threshold. 11. said inhibiting further includes selecting a central setting in the range if the oscillation indicator remains below the threshold during the test. 12. said inhibiting further includes selecting a setting that provides a phase margin above a specified value if the oscillation indicator exceeds the threshold. 13. said inhibiting further includes selecting a setting that maximizes the phase margin if the oscillation indicator exceeds the threshold. 14. means for testing a range of settings of the adjustable phase shifter and determining whether an oscillation indicator exceeds a threshold. 15. a means for modulating the receive signal.

It should be understood that the drawings and corresponding detailed description do not limit the disclosure, but on the contrary, they provide the foundation for understanding all modifications, equivalents, and alternatives falling within the scope of the appended claims.

DETAILED DESCRIPTION

The particulars of the disclosed apparatus and methods are given by way of example and for purposes of illustrative discussion of the preferred embodiments of the present disclosure only and are presented in the cause of providing what is believed to be the most useful and readily understood description of the principles and conceptual aspects of various embodiments of the disclosure. In this regard, no attempt is made to show structural details of the disclosure in more detail than is necessary for the fundamental understanding of the disclosure, the description taken with the drawings making apparent to those skilled in the art how the several forms of the disclosure may be embodied in practice.

Figure 1A:
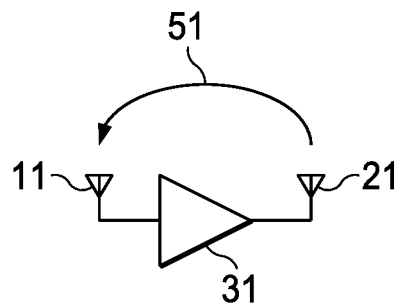
FIG. 1A is a schematic diagram of an illustrative active reflector with antenna pair.

FIG. 1A is a schematic diagram of an illustrative active reflector design having a pair of antennas. The illustrated active reflector has a receiver antenna 11 and transmitter antenna 21. The received signal RX is amplified by the amplifier 31 to provide the transmitted signal TX. While attempts are made to keep the transmit and receive signals isolated, in practice some of the transmitted energy "leaks" from the transmitter antenna to the receiver antenna, creating an undesired feedback loop. Arrow 51 represents the feedback which may be attributed to the cross interference between the received signal RX and the transmitted signal TX. Regardless of whether the received radar waveform is modulated by the reflector, the re-transmitted signal typically contains an amplified and phase-shifted version of the RX signal's fundamental harmonic. Leakage from the re-transmitted signal may pass through the antenna, package, or die, and may lead to self-induced oscillation. Various methods have been previously proposed to attenuate the re-transmitted signal leaking back. Some of these methods utilize directional antennas, while other methods propose utilization of a plurality of antennas.

Figure 1B:
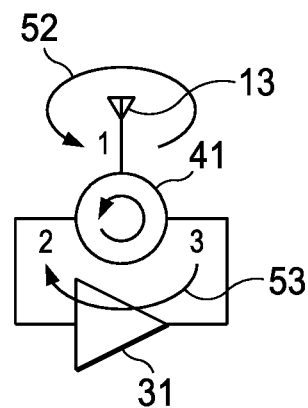
FIG. 1B is a schematic diagram of an illustrative active reflector with a quasi-circulator.

FIG. 1B is a schematic of another illustrative active reflector design with a quasi-circulator 41 (or some other form of directional coupler that couples a bidirectional signal path to two unidirectional signal paths), which enables a single antenna 13 to be used for both reception and transmission simultaneously. The antenna 13 is coupled to a first port 1 of the quasi-circulator. The quasi-circulator couples a receive signal from port 1 to a second port 2. From port 2, the receive signal gets amplified by the amplifier 31 and coupled to a third port of 3 of the quasi-circulator 41. The quasi-circulator couples the transmit signal to port 1 for the antenna. Because the quasi-circulator 41 has a high isolation from the third port 3 to the second port 2, it provides isolation between the receive and transmit signals in order to reduce cross interference between the receive signal RX and the transmit signal TX. But RX-TX interference may still exist due to both quasi-circulator leakage and antenna self-interference. The arrow 52 represents the self-interference of antenna and the arrow 53 represents quasi-circulator leakage.

Figure 1C:
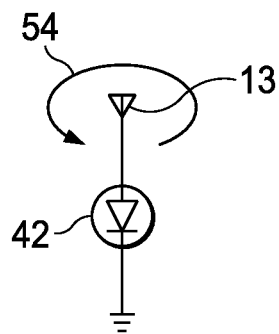
FIG. 1C is a schematic diagram of an illustrative active reflector with a reflection amplifier.

FIG. 1C is a schematic of yet another illustrative active reflector design employing a reflection amplifier 42. This design also allows use of a single antenna 13 for both RX and TX. Reflection amplifiers rely on an injection-locked oscillator or an IMPATT diode for converting the receive signal to a transmit signal, but antenna self-interference can still be a problem. The arrow 54 represents the self-interference of antenna.

Figure 2:
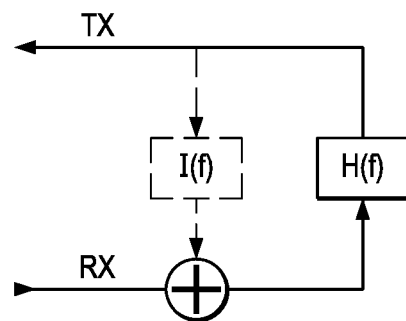
FIG. 2 is a illustrative signal flow graph including self-interference.

FIG. 2 is a signal flow graph representing the operation of an active reflector having self-interference. The interference can be represented by a feedback path between the transmit signal TX and the receive signal RX with the Fourier-domain transfer function gain I(f). Where the transmit signal's Fourier transform is T(f), the receive signal's Fourier transform is R(f), and the amplifier's transfer function is H(f), the active reflector's output can be expressed as $$T(f) = R(f)H(f)/(1 - H(f)I(f))$$

Where the denominator vanishes (i.e., where H(f)I(f) is approximately equal to one), the system becomes unstable and prone to self-induced oscillation. Because the interference feedback transfer function I(f) is unpredictable and subject to change from the environment, one possible course of action is to keep the amplifier's gain H(f) at a low level to minimize the risk of oscillation. However, this approach limits the performance of the active reflector.

Figure 3:
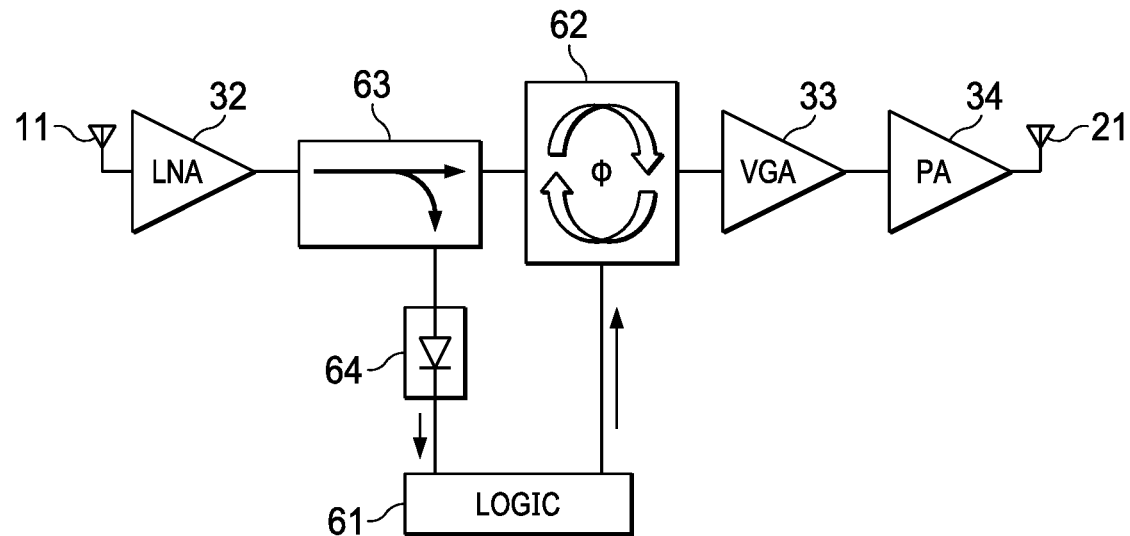
FIG. 3 is a block diagram of a first illustrative active reflector that inhibits self-oscillation.

FIG. 3 shows an embodiment of the active reflector that is tunable to inhibit oscillation. The illustrated active reflector embodiment includes a dedicated receive antenna 11 that is used to detect the incoming signal from a radar source, and a separate transmit antenna 21 that is used to radiate the outgoing signal. As discussed herein, a portion of the outgoing signal transmitted from the transmit antenna 21 is received as feedback at the input to the receive antenna 11. Thus, the incoming signal additionally includes some measure of interference while the active reflector transmits. As discussed below in detail, the improved reflector embodiments enable dynamic tuning which takes the self-interference into account and thereby inhibits self-induced oscillation.

The incoming signal received by receive antenna 11 may be filtered and amplified by a low noise amplifier (LNA) 32. The low noise amplifier 32 is preferably located very close to the receive antenna 21 to reduce losses in the feed line. By using a low noise amplifier, the effect of noise from subsequent stages of the receive chain is diminished. A power coupler 63 passes the amplified signal to a power detector 64 and an adjustable phase shifter 62.

Power detector 64, which may take the form of a rectifying diode feeding a low-pass filter, measures the power level of the receive signal. A controller 61 detects the power level, and based at least partly on the power level, supplies a selected phase shift and selected gain to the adjustable phase shifter 62 and the variable gain amplifier (VGA) 33. Adjustable phase shifter 62 applies the selected phase shift to the amplified signal before passing it to VGA 33, which in turn applies the selected gain to the phase-shifted signal to produce a transmit signal. A power amplifier 34 then drives the transmit antenna 21 with the transmit signal. The amplifiers 32, 33 and 34 form an amplification chain. Since the amplification chain can add energy to the incoming signal, the radar reflection strength can be enhanced and potentially augmented by additional information, which is useful for radar detection applications.

In at least some embodiments, the phase shifter can sweep the applied phase shift through an entire 360°, e.g., by deriving quadrature signals, applying adjustable weight coefficients, and recombining the weighted quadrature signals as a phase-shifted signal. The controller 61 may take the form of a programmable digital signal processor executing firmware in embedded memory, or may be implemented as hard-wired application-specific integrated circuit (ASIC) logic.

In at least some embodiments, adjustable phase shifter 62 can sweep through an entire 360 degree range of phase shift settings. The controller 61 may periodically sweep through entire phase shift range, measuring the receive signal power level to determine how the power level varies as a function of phase shift. Because the power level measurement may be noisy, multiple measurements may be acquired at each phase shift and averaged to improve the measurement's signal-to-noise ratio. When the active reflector begins to oscillate, the receive signal power level will increase rapidly until the operational limits are reached. Accordingly, power level measurements above a given threshold may be indicative of self-induced oscillation, particularly if it keeps occurring for one phase shift and not others.

In some embodiments, the controller 61 stores the power level measurements as a function of phase shift in the memory, averaging multiple measurements for each phase shift, before comparing the measurements to the threshold. In other embodiments, the controller 61 compares each measurement as it is acquired to the threshold to detect whether the threshold is exceeded. The controller may increment a count for that phase shift each time the comparison exceeds the threshold. After multiple measurements have been acquired for each phase shift, the phase shifts where the threshold was exceeded multiple times may be identified as the problematic ones.

The controller 61 periodically or systematically varies the phase shift setting to monitor the dependence of receive signal power level on phase shift. The controller 61 further determines which, if any, phase shifts tend to be associated with receive signal power levels that exceed the threshold, and identifies those phase shifts as ones where the active reflector is vulnerable to self-induced oscillation. If any phase shifts are identified as problematic, the controller maintains the setting for the adjustable phase shifter at a different value during normal operation (i.e., when not measuring the phase shift-power level dependence), preferably at a value that maximizes the phase shift margin relative to the problematic values, or one that provides at least a minimum specified phase margin. In some embodiments, the controller may also be configured to maintain a high signal strength, which implies a high reflection gain.

In some embodiments, due to an incident signal, the RF power level sampled by the power detector 64 can be high at a phase setting at which the reflector will not oscillate. To guard against this erroneous detection of excessive power level, the controller 61 controls the adjustable phase shifter 62 to sweep several times, repeats sampling the power level several times, and averages the sampled power level for each phase shift setting. In some embodiments, the processor removes the maximum value of the sampled power level for each phase shift and averages the remaining sampled power levels, the average result acts as the sampled power level for each phase shift.

In some embodiments, the active reflector can be used as an active tag to modulate data on the radar waveform and retransmit it. The active reflector may utilize frequency translation to shift the frequency of the receive signal. In both cases, the reception frequency is different from the transmission frequency, which will reduce but not necessarily eliminate the interference between the transmit and receive signals.

Figure 4:
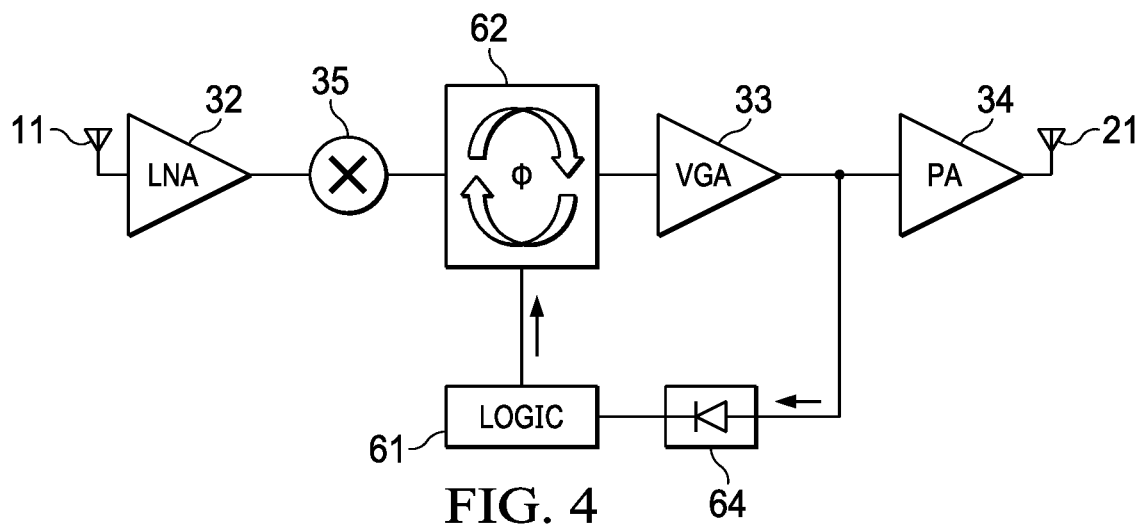
FIG. 4 is a block diagram of a second illustrative that inhibits self-oscillation.

FIG. 4 shows an illustrative embodiment of the active reflector acting as an active tag. The incoming signal is received by receive antenna 11, filtered and amplified by a low noise amplifier (LNA) 32, and then the receive signal is frequency shifted or modulated by a modulator 35. The frequency shifted or modulated receive signal is then phase shifted by adjustable phase shifter 62, amplified by a variable gain amplifier (VGA) 33, and driven to the transmit antenna by a power amplifier (PA) 34. In order to prevent oscillation of the active tag, similar to FIG. 3, the active tag further comprises a real-time loop phase calibration including a power detector 64 and a controller 61 that controls the adjustable phase shifter 62 at least partly in response to the power level measurements from the detector. The logic circuit 61 is configured to control the sweep of the adjustable phase shifter 62. One of the skilled in the art will understand that the position of the power detector 64, which may take the form of a rectifying diode feeding a low-pass filter, is not critical to the functionality of the active reflector. In this embodiment, the power detector 64 samples output power level of the variable gain amplifier 33.

The logic circuit 61 controls the phase shifter 62 to sweep the amplification chain phase over 360 degrees once in a period, reads the RF power level for each phase step, constructs a phase-power vector and find the phase at which the reflector oscillates, in order to prevent oscillation, the logic circuit 61 sets the phase shift to maximize the phase margin.

Figure 5:
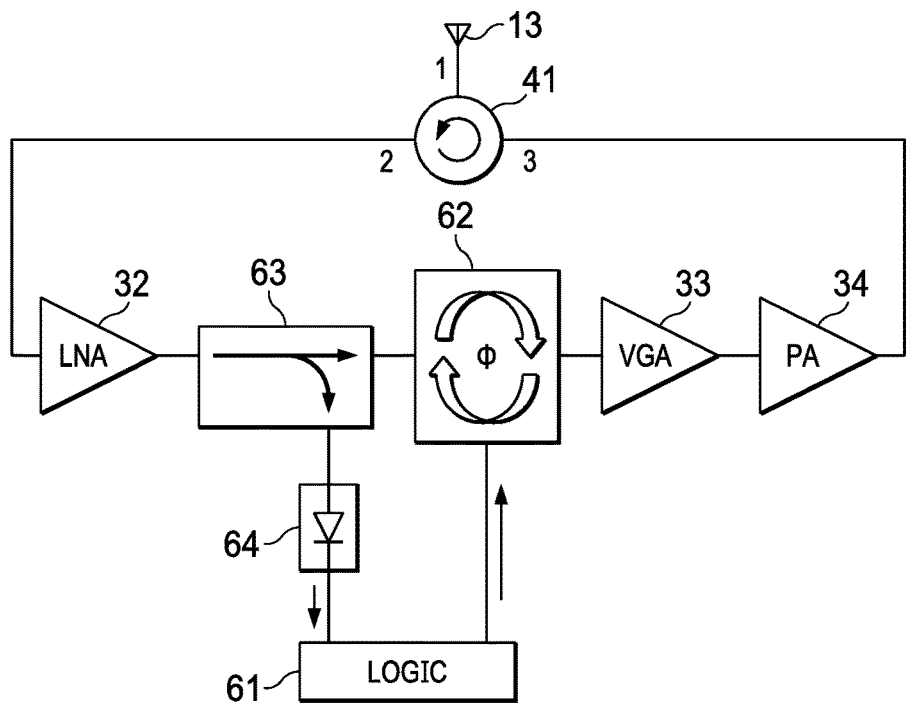
FIG. 5 is a block diagram of a third illustrative active reflector that inhibits self-oscillation.

FIG. 5 shows yet another embodiment of the active reflector. The active reflector has a quasi-circulator 41 (or other form of directional coupler that couples two unidirectional signal paths to a bidirectional signal path) to allow using a single antenna 13 to be used for both RX and TX. The antenna 13 is electrically connected to a first port 1 of the quasi-circulator 41. A second port 2 of the quasi-circulator 41 is electromagnetically coupled to a circuit having a low noise amplifier (LNA) 32, a variable phase shifter 62, a variable gain amplifier 33 and a power amplifier 34 in series. The output of power amplifier 34 is electromagnetically coupled to the third port 3 of the quasi-circulator 41. The active reflector further comprises a real-time loop phase calibration circuit including a logic circuit 61, a variable phase shifter 62, and a power detector 63. The logic circuit 61 is configured to control the sweep of the variable phase shifter 62. The power splitter 63 directs the receive signal to the power detector 64 and the adjustable phase shifter 62. The controller may use the above described method of real-time loop phase calibration to prevent oscillation of the active reflector.

Because the real-time loop phase calibration circuit dynamically calibrates the phase of the active reflector to prevent oscillation, performance stability is ensured over any process, temperature, and supply voltage variations, with minimal effect on the reflected signal magnitude. Likewise, active reflector IC can be designed without prior availability of package and antenna models.

The equivalent radar cross section (RCS) of the active reflector is calculated by comparing the power reflected by the active reflector with the power reflected by a target with an RCS of σ:

$$\frac{G_{rad}^2 \lambda^2 \sigma}{(4\pi)^3 R^4} = \Gamma \left( \frac{G_{rad} G_{ref} \lambda^2}{(4\pi)^2 R^2} \right)^2$$

where $G_{rad}$ is the radar source's antenna gain, $\lambda$ is the wavelength, R is the target range, $\Gamma$ is the active power reflection coefficient (i.e., gain factor applied by the amplification chain), and $G_{ref}$ is the reflector antenna gain. After simplifying the expression, the equivalent RCS as a function of $\Gamma$ and $G_{ref}$ is found to be $$\sigma_{eq} = \frac{\Gamma \lambda^2 G_{ref}^2}{4\pi}$$

Figure 6:
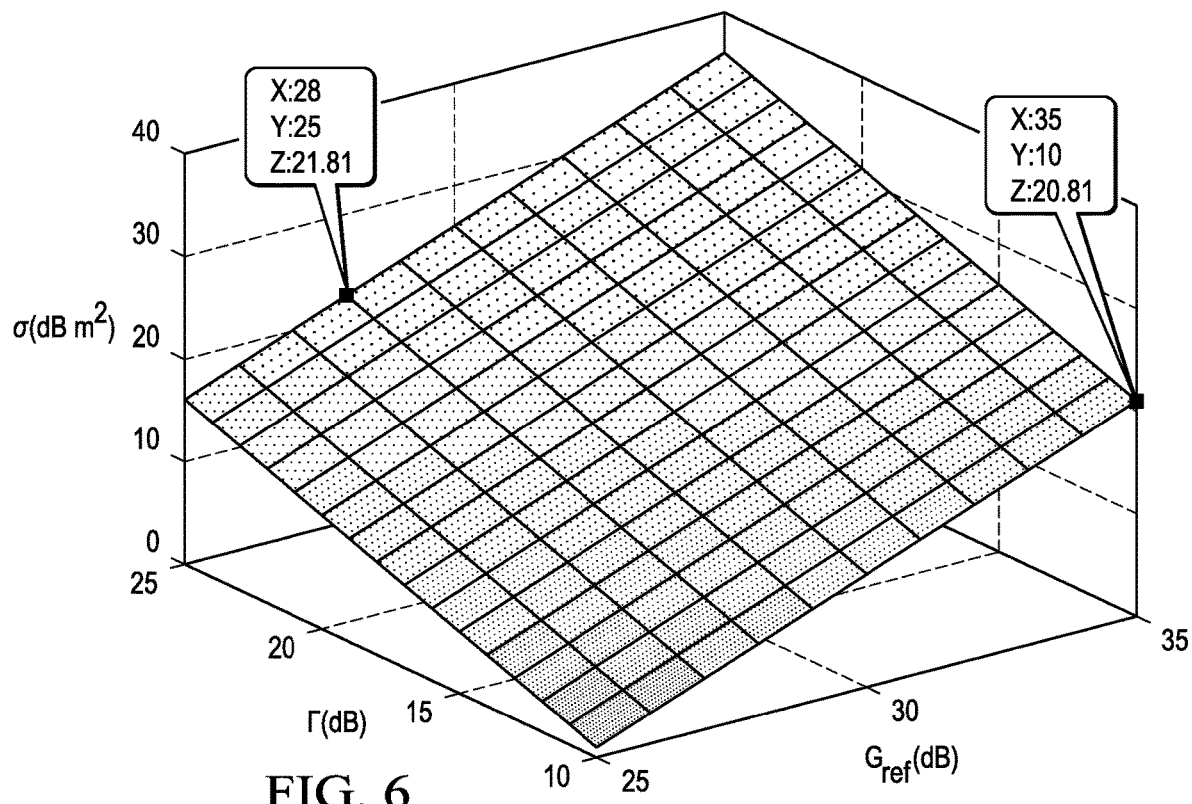
FIG. 6 is an illustrative graph of a reflector's radar cross section (RCS) as a function of $\Gamma$ and $G_{ref}$.

FIG. 6 shows the RCS as a function of $\Gamma$ and $G_{ref}$, swept over 10 dB-15 dB and 25 dB-35 dB, respectively. The higher the gain of the reflector, the larger is the equivalent radar cross section (RCS). Because the real-time loop phase calibration circuit calibrates the phase of the active reflector to prevent oscillation, reflection gain $\Gamma$ is not limited by stability concerns and can be set as needed to improve maximum radar range and visibility of small vehicles. An RCS-equivalent of a mid-sized passenger vehicle can be easily achieved with feasible active reflection and reasonable reflector antenna gain $G_{ref}$ values (high antenna gain can be reached if the beam width in the elevation axis is kept reasonably narrow).

Other potential advantages of the disclosed active reflectors further include being compatible with all radar waveforms because the radar signal doesn't need to be modulated; and opportunities for cost and routing loss reduction exist, e.g., by using one antenna for both RX and TX if a quasi-circulator (or other directional coupler) is employed. Such active reflectors are expected to play an integral part in the automotive radar ecosystem. The applications of the active reflector include: increasing visibility of small vehicles (motorcycles and even bicycles) at a far range or in the vicinity of a large scatter (such as a truck), radar testing or modulation of information on the target signal.

While the focus of the foregoing discussions has been on active reflectors for radar systems, the principles are applicable to other forms of echo detection systems including sonar, ultrasonic, lidar, and RFID technologies. These and numerous other modifications, equivalents, and alternatives, will become apparent to those skilled in the art once the above disclosure is fully appreciated. It is intended that the following claims be interpreted to embrace all such modifications, equivalents, and alternatives where applicable.

What is claimed is:

1. An active reflector comprising:
   an antenna;
   a bidirectional signal path coupled to the antenna;
   a directional coupler, coupled to the bidirectional signal path, a unidirectional receive signal path and a unidirectional transmit signal path, configured to convey a receive signal from the antenna to the unidirectional receive signal path and to convey a transmit signal from the unidirectional transmit signal path to the antenna;
   the unidirectional receive signal path configured to convey the receive signal;
   the unidirectional transmit signal path configured to convey the transmit signal;
   an active reflector circuit, coupled to the unidirectional receive signal path and the unidirectional transmit signal path, configured to generate the transmit signal by amplifying the receive signal and applying a phase shift in a range of phase shifts; and
   a calibration circuit, coupled to the active reflector circuit, configured to select the phase shift based at least in part on one or more measurements at different phase shifts in the range of phase shifts, wherein the calibration circuit is configured to sweep the phase shift over the range of phase shifts, and
   wherein the phase shift is selected to inhibit or reduce oscillation of the transmit signal associated with interference with the receive signal.

2. The active reflector of claim 1, wherein the active reflector circuit comprises:
   an amplifier coupled to the unidirectional receive signal path;
   an adjustable phase shifter, coupled to the amplifier, configured to apply the phase shift in the range of phase shifts;
   a variable gain amplifier coupled to the adjustable phase shifter; and
   a second amplifier coupled to the variable gain amplifier and the unidirectional transmit signal path.

3. The active reflector of claim 1, wherein the active reflector further comprises a power splitter, coupled to the active reflector circuit and the calibration circuit, configured to couple a portion of the receive signal to the calibration circuit.

4. The active reflector of claim 1, wherein the calibration circuit comprises a power detector configured to measure a power of the receive signal.

5. The active reflector of claim 4, wherein the calibration circuit comprises control logic, coupled to the power detector, configured to select the phase shift based at least in part on one or more measurements of the power at different phase shifts in the range of phase shifts, and configured to sweep the phase shift over the range of phase shifts.

6. The active reflector of claim 5, wherein the active reflector circuit comprises an adjustable phase shifter, coupled to the calibration circuit, configured to apply the phase shift in the range of phase shifts.

7. The active reflector of claim 5, wherein the control logic is configured to select the phase shift based at least in part on a phase margin of the active reflector when oscillation of the transmit signal exceeds threshold value.

8. The active reflector of claim 1, wherein the active reflector is configured to sweep the phase shift over the range of phase shifts once per period of the transmit signal.

9. The active reflector of claim 1, wherein the directional coupler comprises a quasi-circulator.

10. The active reflector of claim 1, wherein the receive signal and the transmit signal have a carrier frequency in a band of frequencies corresponding to: radar, sonar, lidar, ultrasound, or radio frequency identification (RFID).

11. A vehicle, comprising:
    an active reflector, wherein the active reflector comprises:
    an antenna;
    a bidirectional signal path coupled to the antenna;
    a directional coupler, coupled to the bidirectional signal path, a unidirectional receive signal path and a unidirectional transmit signal path, configured to convey a receive signal from the antenna to the unidirectional receive signal path and to convey a transmit signal from the unidirectional transmit signal path to the antenna;
    the unidirectional receive signal path configured to convey the receive signal;
    the unidirectional transmit signal path configured to convey the transmit signal;
    an active reflector circuit, coupled to the unidirectional receive signal path and the unidirectional transmit signal path, configured to generate the transmit signal by amplifying the receive signal and applying a phase shift in a range of phase shifts; and a calibration circuit, coupled to the active reflector circuit, configured to select the phase shift based at least in part on one or more measurements at different phase shifts in the range of phase shifts, wherein the calibration circuit is configured to sweep the phase shift over the range of phase shifts, and wherein the phase shift is selected to inhibit or reduce oscillation of the transmit signal associated with interference with the receive signal.

12. The vehicle of claim 11, wherein the active reflector circuit comprises:

an amplifier coupled to the unidirectional receive signal path;

an adjustable phase shifter, coupled to the amplifier, configured to apply the phase shift in the range of phase shifts;

a variable gain amplifier coupled to the adjustable phase shifter; and a second amplifier coupled to the variable gain amplifier and the unidirectional transmit signal path.

13. The vehicle of claim 11, wherein the active reflector further comprises a power splitter, coupled to the active reflector circuit and the calibration circuit, configured to couple a portion of the receive signal to the calibration circuit.

14. The vehicle of claim 11, wherein the calibration circuit comprises a power detector configured to measure a power of the receive signal.

15. The vehicle of claim 14, wherein the calibration circuit comprises control logic, coupled to the power detector, configured to select the phase shift based at least in part on one or more measurements of the power at different phase shifts in the range of phase shifts, and configured to sweep the phase shift over the range of phase shifts.

16. The vehicle of claim 15, wherein the active reflector circuit comprises an adjustable phase shifter, coupled to the calibration circuit, configured to apply the phase shift in the range of phase shifts.

17. The vehicle of claim 15, wherein the control logic is configured to select the phase shift based at least in part on a phase margin of the active reflector when oscillation of the transmit signal exceeds threshold value.

18. A method for applying a phase shift, comprising:

by an active reflector:

receive, via a bidirectional signal path, a receive signal from an antenna;

conveying, via a directional coupler and a unidirectional receive signal path, the receive signal to an active reflector circuit;

generating, using the active reflector circuit, a transmit signal by amplifying the receive signal and applying the phase shift in a range of phase shifts;

selecting, using a calibration circuit, the phase shift based at least in part on one or more measurements at different phase shifts in the range of phase shifts, wherein the selecting comprises sweeping the phase shift over the range of phase shifts, and wherein the phase shift is selected to inhibit or reduce oscillation of the transmit signal associated with interference with the receive signal;

conveying, via a unidirectional transmit signal path, the directional coupler, the transmit signal to the bidirectional signal path; and providing, via the bidirectional signal path, the receive signal to the antenna.

19. The vehicle of claim 18, wherein the phase shift is selected based at least in part on a phase margin of the active reflector when oscillation of the transmit signal exceeds threshold value.

20. The method of claim 18, wherein the receive signal and the transmit signal have a carrier frequency in a band of frequencies corresponding to: radar, sonar, lidar, ultrasound, or radio frequency identification (RFID).

\* \* \* \* \*